(12) United States Patent
Colbert et al.

(10) Patent No.: US 7,624,240 B1
(45) Date of Patent: Nov. 24, 2009

(54) SEPARATE SWAP FILES CORRESPONDING TO DIFFERENT VIRTUAL MACHINES IN A HOST COMPUTER SYSTEM

(75) Inventors: Osten Kit Colbert, San Francisco, CA (US); Carl Waldspurger, Palo Alto, CA (US); Xiaoxin Chen, Cupertino, CA (US); Anil Rao, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 235 days.

(21) Appl. No.: 11/582,734

(22) Filed: Oct. 17, 2006

(51) Int. Cl.
*G06F 12/00* (2006.01)

(52) U.S. Cl. .................. 711/159; 711/162; 718/104

(58) Field of Classification Search ................. 711/159, 711/162; 718/104
See application file for complete search history.

(56) References Cited

U.S. PATENT DOCUMENTS

2003/0037060 A1* 2/2003 Kuehnel ................. 707/103 R

* cited by examiner

*Primary Examiner*—Christian P Chace
*Assistant Examiner*—Mehdi Namazi

(57) ABSTRACT

A swap space is provided for a host computer system, where the swap space includes a plurality of swap files with each individual swap file for swapping data only for a single corresponding virtual machine (VM). The per-VM swap space is used solely by the single, corresponding VM, such that only that particular VM's memory is allowed to be swapped out to the swap file.

39 Claims, 12 Drawing Sheets

SEPARATE SWAP FILES CORRESPONDING TO DIFFERENT VIRTUAL MACHINES IN A HOST COMPUTER SYSTEM

BACKGROUND OF THE INVENTION

1. Field of the Invention

This invention relates generally to a virtualized computer system and, in particular, to a method and system for using swap space for host physical memory with separate swap files corresponding to different virtual machines.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multiprocessor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, ..., 210-m (VCPU0, VCPU1, ..., VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implement one illustrated embodiment of the invention are shown and described as being located logically between all virtual machines and the underlying hardware platform and/or system-level host software. These components will usually be part of the overall virtualization software, although it would be possible to implement at least some part of them in specialized hardware. The illustrated embodiments are given only for the sake of simplicity and clarity and by way of illustration—as mentioned above, the distinctions are not always so clear-cut. Unless otherwise indicated, the invention described below may be used in virtualized computer systems having any type or configuration of virtualization software. Moreover, the invention is described and illustrated below primarily as including one or more "VMMs" that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, 210-1, . . . , 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

In order to more efficiently utilize memory resources in a computer system, the concept of virtual memory is often used. For example, FIG. 2 illustrates virtual memory management and address mapping functions performed by the VMM 300 and other various components of a virtualized computer system. The guest OS 220 generates a guest OS page table 292. The guest OS page table 292 contains mappings from GVPNs (Guest Virtual Page Numbers) to GPPNs (Guest Physical Page Numbers). Suppose that a guest application 260 attempts to access a memory location having a first GVPN, and that the guest OS 220 has specified in the guest OS page table 292 that the first GVPN is backed by what it believes to be a "real," physical memory page having a first GPPN. The mapping from the first GVPN to the first, GPPN is used by the virtual system hardware 201, and it is loaded into a VTLB (Virtual Translation Look-Aside Buffer) 294 which operates as a cache for the frequently accessed mappings from the GVPN to the GPPN.

A virtualized computer system typically uses a second level of address indirection to convert what the guest OS treats as a "real" address in physical memory into an address that in fact is an address in the hardware (physical) memory. The memory management module 350 thus translates the first GPPN into a corresponding actual PPN (Physical Page Number), which, in some literature, is equivalently referred to as an MPN (Machine Page Number). This translation is typically carried out by a component such as a so-called Bus-Mem/PhysMem table, which includes mappings from guest physical addresses to bus addresses and then to physical (hardware, or "machine") addresses. The memory management module 350 creates a shadow page table 392, and inserts a translation into the shadow page table 392 mapping the first GVPN to the first PPN. In other words, the memory management module 350 creates shadow page tables 392 that function as a cache containing the mapping from the GVPN to the PPN. This mapping from the first GVPN to the first PPN is used by the system hardware 100 to access the actual hardware storage device that is backing up the GVPN, and is also loaded into the TLB (Translation Look-Aside Buffer) 194 to cache the GVPN to PPN mapping for future memory access.

Note that the concept of "virtual memory" is found even in non-virtualized computer systems, where "virtual page numbers" are converted into "physical page numbers." One effect of the second level of address indirection introduced in a virtualized computer system is thus that the guest physical page numbers, which the guest OS thinks refer directly to hardware are in fact treated by the underlying host OS (or similar system-level component) as virtual page numbers, which are again remapped into hardware memory. To avoid any confusion that might result from the terms "virtual memory" and "virtual page number," etc., being used even in literature describing non-virtualized computer systems, and to keep terminology as consistent as possible with convention, GVPNs and GPPNs refer here to the page numbers generated within the guest, and PPNs are the page numbers for pages in hardware (machine) memory.

FIG. 3 illustrates a conventional swap space in a virtualized computer system. As illustrated above, by using a virtual memory scheme, each VM in a virtualized computer system is given the illusion of being a dedicated physical machine, with dedicated "physical" memory. System administrators of the virtualized computer system may over-commit memory, so that the aggregate amount of virtualized "physical" memory presented to the VMs exceeds the total amount of actual physical memory 130 on the host 100. When memory is overcommitted, the system typically needs to reclaim memory from some VMs, so that the amount of host physical memory 130 allocated to each VM may be less than the amount of virtualized "physical" memory presented to the VM. One memory reclamation technique is "transparent swapping" (also known as "paging"), in which the contents of some memory is moved ("swapped out") to a "backing store" or a "swap space," such as disk storage, instead of remaining resident in the host's physical memory 130. When the VM later accesses memory data that have been swapped out, the virtualization system "swaps in" the relevant portion of the memory, possibly causing other portions of the memory to be swapped out. Some systems also specify an amount of VM virtualized "physical" memory that is guaranteed to be backed by actual host physical memory (i.e., the reserved part of the physical memory for a VM). In order to ensure that the virtualized computer system is able to preserve the contents of all VM memory under any circumstances, swap space must be reserved for any remaining VM memory, i.e., for the difference between the VM's virtualized "physical" memory size and the size of its guaranteed reserved memory.

In conventional virtualization systems, swap space is allocated from a common pool of disk storage associated with the host. Referring to FIG. 3, the physical memory 130 of the host hardware 100 uses a common swap space 350 to swap the contents of the memory 130 when the memory 130 is over-committed to the VMs 200-1, 200-2, . . . , 200-N. At the control of the kernel 600 or other similar virtualization software, the contents of the memory 130 are swapped out to the common swap space 350 when the memory 130 is over-committed to free up the memory 130. Also, the former contents of the memory 130 are swapped back into the memory 130 from the common swap space 350 if the VMs 200-1, 200-2, . . . , 200-N attempt to access the content.

Note that the physical (hardware) memory 130 for all of the VMs 200-1, 200-2, . . . , 200-N is backed by a single, common swap space 350, although the common swap space 350 may be physically comprised of different disks, partitions, or files. Therefore, the content from the memory 130 corresponding to the various VMs 200-1, 200-2, . . . , 200-3 may be swapped out to the common swap space 350, mixed up with one another, and there is no particular part of the common swap space 350 that is dedicated for swapping content from portions of the memory 130 only corresponding to a particular VM 200-1, 200-2, . . . , 200-N. In other words, the common swap space 350 is a "per-host common pool" and the swap spaces for all VMs on the host are grouped together into a single logical space. This presents a number of problems.

First, if a VM is live-migrated from one physical host to another physical host while the VM is powered on, then any VM memory that is currently swapped out to the common swap space 350 must be swapped back in from the source host's swap storage 350 to the physical memory 130, putting pressure on the memory 130. Extra cycles of the CPU 110 are needed to handle the swap in requests. This leaves the host computer system with less overall CPU cycles and storage bandwidth, which will negatively affect the performance of other VMs running on the host computer system. Even worse, swapping back in all of the migrating VM's memory data will increase the amount of total physical host memory used, which could result in the host computer system swapping out other VMs' memory to the common swap space 350, thus degrading their performance even further. The content that is swapped back into the memory of the source host should then be copied to the memory of the destination host, which may itself need to swap it out to the destination host's common swap space. In short, VM migration could be very disruptive to the host computer system as a whole when a common "per-host" swap space 350 is used for all the VMs running on the host.

Second, another disadvantage of the common swap space 350 is that the size of the per-host swap space has to be pre-calculated by the administrator of the host computer system. It has to be big enough to support all the VMs running on the host but not too big such that there is unused, wasted swap space. This is an administrative burden that is likely to lead to a sub-optimum size of the common swap space 350.

Third, another disadvantage of the common swap space 350 is that access control can only be applied to the common swap space 350 as a whole. This means that by having access to the swap space, one has access to the swapped memory of all the running VMs, which is not desirable from a security standpoint.

Fourth, using a per-host common pool for swap space also prevents administrators and users of the host computer system from controlling where in the swap space 350 the swapped memory for different VMs will be placed, and the related quality-of-service parameters. For example, an administrator of the host computer system may want to place the swap space for high-priority VMs on a highly-available high-performance disk array, and place the swap space for low-priority VMs on cheaper, slower disks, which is not possible to implement with the conventional common swap space 350 for all the VMs. Similarly, an administrator of the host computer system may want to provide additional features, such as hardware-based encryption, to the swap space for some VMs but not for other VMs, which is not possible to implement with the conventional common swap space 350 for all the VMs.

Therefore, there is a need for swap space for swapping the physical memory in a host computer system, where VMs using the swap space can be migrated to another physical host efficiently and quickly. There is also a need for swap space for swapping the physical memory in a host computer system, where the swap space for different VMs can be controlled separately. There is also a need for providing finer-grained controls of the swap spaces on the VM level rather than on a per-host level.

SUMMARY OF THE INVENTION

The present invention provides a swap space for a host computer system where the swap space includes a plurality of swap files with each individual swap file for swapping memory data only for a single corresponding VM. This "per-VM" swap space is used solely by the single, corresponding VM, meaning that only that particular VM's memory data is allowed to be swapped out to the swap file.

The swap files are regular files that can reside on any type of file system or underlying storage, so long as it is accessible by the virtualization system. By being a regular file that is associated with a particular VM, rather than a particular host, the per-VM swap files have many advantages. First, for VM migration from one physical host to another physical host, the source host no longer has to disruptively empty the swap file but can simply close the swap file and copy it to the destination host, where the destination can open and use it. Alternatively, if the source host and the destination share the storage that the swap file resides on, then the swap file need not be copied; the swap file can simply be closed by the source host, then immediately opened on the destination host, which effectively transfers all the swapped out data in the swap file from the source host to the destination host. Second, the per-VM swap files can be arbitrarily located, moved, re-sized and deleted as necessary, and access controls and permissions can be applied to the swap files at a fine-grained per-VM swap file level, resulting in flexibility in the management of the VM's swap space.

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary operating system (OS), both where the OS is designed to support virtual machines and where it is not. Moreover, the invention may even be implemented wholly or partially in hardware, for example in processor architectures intended to provide hardware support for virtual machines.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 4:
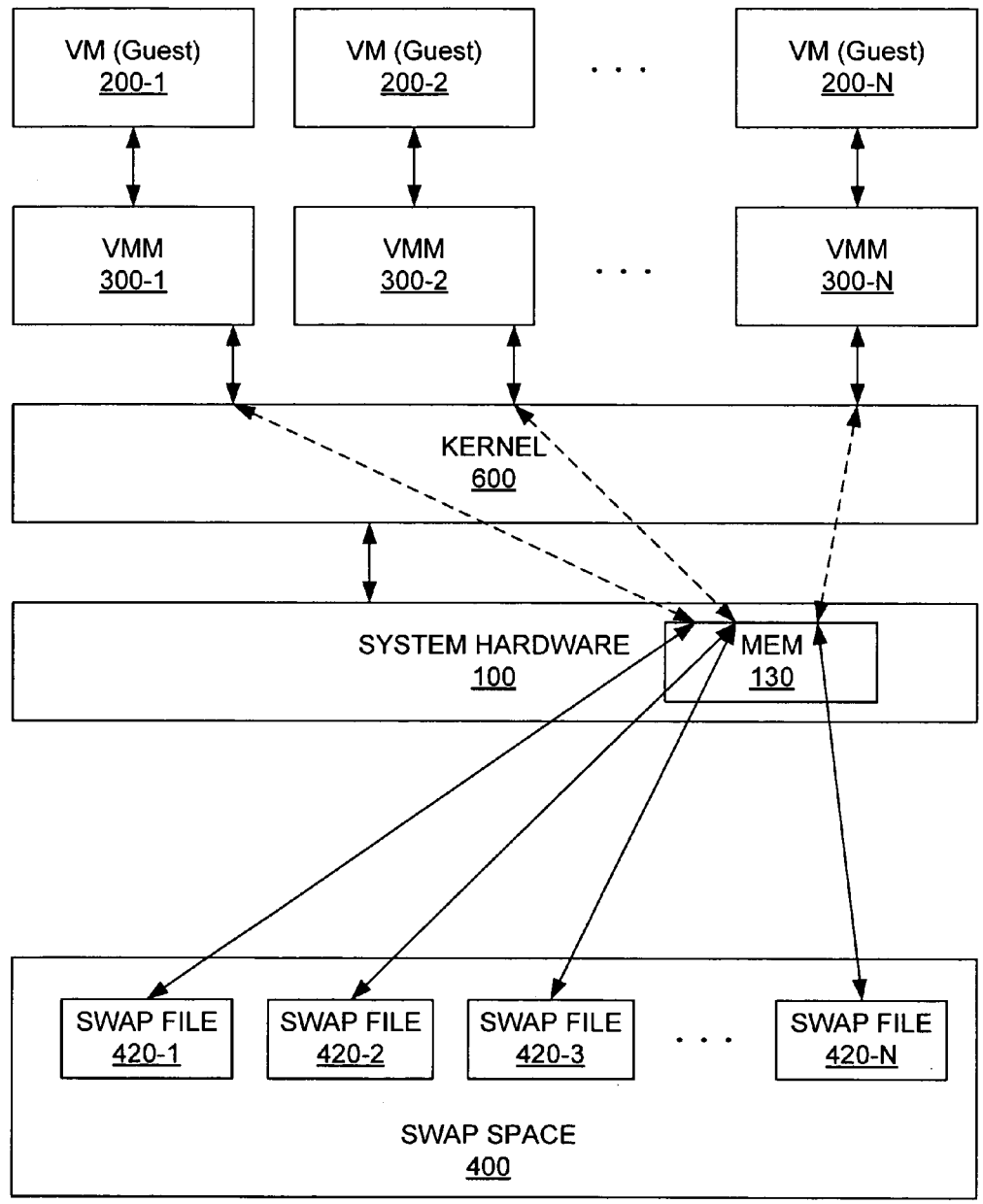
FIG. 4 illustrates a swap space in a host computer system, according to one embodiment of the present invention.
Figure 5:
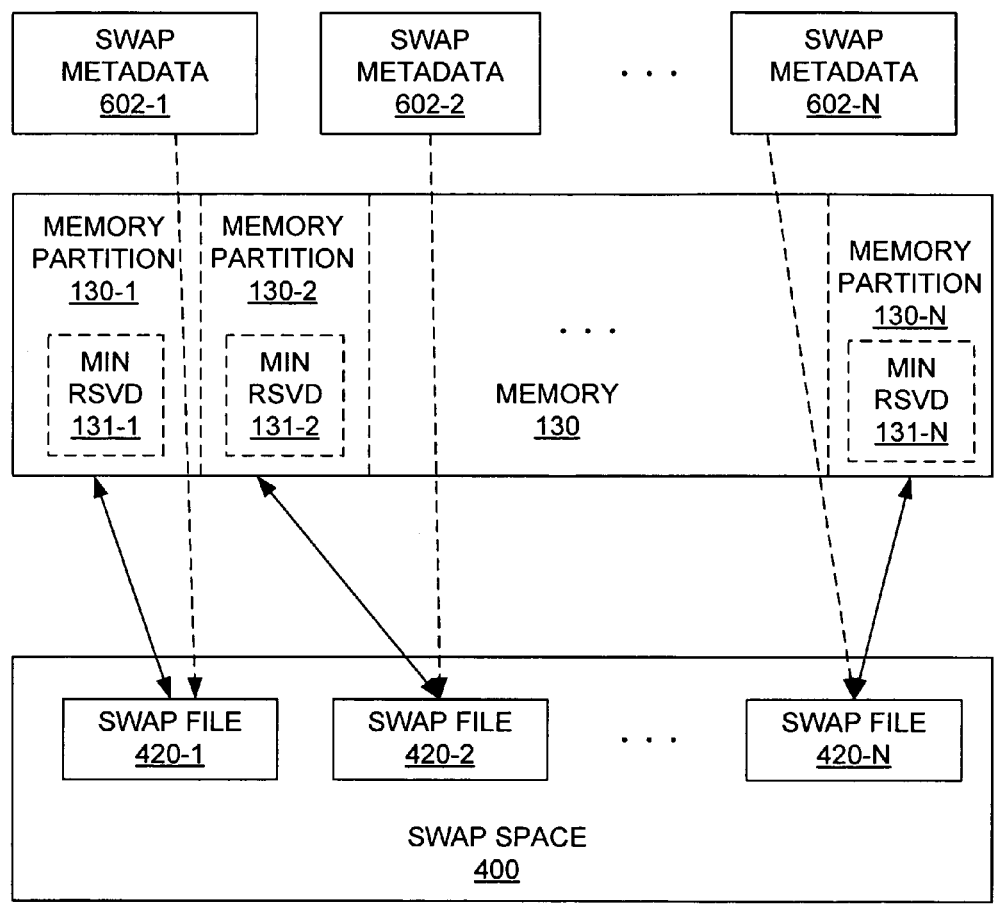
FIG. 5 illustrates the swap space in a host computer system in more detail, according to one embodiment of the present invention.

FIG. 4 illustrates a swap space in a host computer system, according to one embodiment of the present invention, and FIG. 5 illustrates the swap space in a host computer system in more detail, according to one embodiment of the present invention. Referring to FIGS. 4 and 5, the physical memory 130 for the VMs 200-1, 200-2, . . . , 200-N is backed by the swap space 400 to store data swapped out from the physical memory 130 when the physical memory 130 is over-committed to the VMs 200-1, 200-2, . . . , 200-N. At the control of the kernel 600 or other virtualization software such as the VMMs 300-1, 300-2, . . . , 300-N, the swap space 400 stores content swapped out from the physical memory 130 and also swaps in the content back to the physical memory 130 when the VMs 200-1, 200-2, . . . , 200-N attempt to access the swapped-out content. The swap space 400 may be on network-attached storage, such as a SAN (Storage Area Network), or may also be part of a local storage on the system hardware 100.

According to the present invention, the swap space 400 is comprised of one or more swap files 420-1, 420-2, 420-3, . . . , 420-N, and an individual swap file 420-1, 420-2, 420-3, . . . , 420-N is created for each VM 200-1, 200-2, . . . , 200-N on the host computer system that is solely for that VM's use. While a single VM (e.g., VM 200-2) may have more than one swap file (e.g., swap files 420-2 and 420-3), each swap file 420-1, 420-2, 420-3, 420-N is associated with only one of the VMs 200-1, 200-2, . . . , 200-N.

Referring to FIG. 5, each logical memory partition 130-1, 130-2, . . . , 130-N corresponds to a single VM and typically includes a minimum reserved portion 131-1, 131-2, . . . , 131-N. Each swap file 420-1, 420-2, . . . , 420-N is sized large enough to accommodate at least the size of the memory partition 130-1, 130-2, . . . , 130-N less its corresponding minimum reserved portion 131-1, 131-2, . . . , 131-N corresponding to the individual VMs 200-1, 200-2, . . . , 200-N.

Referring to FIGS. 4 and 5, the "per-VM" swap file is a regular file and resides on a file-system as other regular files do. As such, it has the same properties as any other regular file. The swap files 420-1, 420-2, 420-3, . . . , 420-N may have one of a variety of formats, although the present invention is not limited to any particular format of the swap file.

In one embodiment, the swap file 420-1, 420-2, . . . , 420-N is a flat file logically split up in fixed-size chunks. Each swap metadata 602-1, 602-2, . . . , 602-N corresponds to one of the swap files 420-1, 420-2, . . . , 420-N, respectively. Using this format, each swap metadata 602-1, 602-2, . . . , 602-N contains information about which locations in the corresponding one of the swap files 420-1, 420-2, . . . , 420-N are used or free. Also, mappings between each chunk (GPPN) of the VM's swapped memory and that chunk's location (swap location) in the swap file may be maintained in a separate data structure (not shown) such as a page table. However, nothing in the swap file 420-1, 420-2, . . . , 420-N itself indicates whether specific chunks in the swap file 420-1, 420-2, . . . , 420-N are used or not. Thus, when live-migrating a VM 200-1, 200-1, . . . , 200-N, the source host sends the information in the swap metadata to the destination host before the destination host can open and use the swap file 420-1, 420-2, . . . , 420-N.

In an alternative embodiment, the swap file 420-1, 420-2, . . . , 420-N itself is comprised of both the swapped-out VM memory and the mapping from the VM memory to the swap file location. Thus, the swap file includes both a data section, containing the content of the VM's swapped-out memory, and a metadata section, containing the mappings from the VM memory to location of the swap file. In this embodiment, there is no requirement for the kernel 600 to maintain a separate swap metadata structure. Such swap metadata is contained implicitly within the swap file in the metadata section, indicating which of the data section locations are used or free.

In another alternative embodiment, the swap file 420-1, 420-2, . . . , 420-N is identity mapped to portions of the physical memory 130 corresponding to the respective VMs 200-1, 200-2, . . . , 200-N, and thus no mapping data structure is needed. In this embodiment, each chunk X of physical memory corresponding to a particular VM is directly mapped to chunk X in the swap file. Thus, the swap file 420-1, 420-2, . . . , 420-N has the same size as the size of the part of the memory corresponding to that particular VM, as any chunk of memory could be swapped out to the swap file at any time. The only metadata needed for an identity-mapped swap file would be a single bit for each chunk of VM's memory, indicating whether it is swapped or not. In this embodiment, there is no separate swap metadata structure maintained by the kernel 600. There is no need to know which swap file locations (pages) are free, since all pages have a fixed slot assignment from the GPPNs to the swap slots.

Using a "per-VM swap file" rather than a common swap space has a number of advantages. It allows for ease of VM migration, VM check-pointing, and isolation from other VMs. In addition, "per-VM" swap files 420-1, 420-2, 420-3, . . . , 420-N have other properties that follow as a result of being a regular file, such as arbitrarily locating the swap files, persisting the swap files as long as desired, re-sizing the swap files at will, and setting or changing access controls for the swap files individually.

Specifically, one advantage of using a per-VM swap file is that VM migration from one physical host to another physical host is optimized and can be performed efficiently. In conventional virtualized computer systems using a per-host common swap space such as that described in FIG. 3, VM migration presents at least two problems: First, before the VM migration can take place, the swap space 350 for the VM has to be allocated on the destination physical host, which may fail if there is not enough free space in the per-host swap space. This could result in aborting the VM migration. In addition, during VM migration, the VM would be using swap space on both physical hosts, effectively utilizing twice as much swap space as it is needed. Second, all of the VM's memory in the swap space must be swapped in to the physical memory of the source host before it can be sent to the destination host. This is expensive both in the amount of CPU cycles and storage bandwidth, and decreases the availability of those resources for other VMs on the source host. Furthermore, it increases pressure on the physical memory of the source host, possibly forcing other VMs to swap out their own memory to the swap space of the source host, further degrading those VMs' performances. In short, VM migration using conventional per-host common swap spaces could be very disruptive to all VMs on the system, even those VMs not migrating to another host. In contrast, the per-VM swap file of the present invention does not have these problems associated with the conventional per-host common swap space.

In one example, the swap space 400 is a network file system or a SAN accessible to both the source and destination physical hosts. In this example, both the source and destination physical hosts have access to the same set of files on the shared storage, although a synchronization mechanism would be needed to prevent the source and destination hosts from using the same portions of the swap file. Assuming that the migrating VM and its swap file are located on the shared storage, no new swap space needs to be reserved on the destination host and the VM's swapped memory is automatically accessible to the destination host machine. This is because the VM's swap space can be used simultaneously by both the source and destination hosts and the VM's swap file for the source host can also be opened directly by the destination host. Thus, there is no need to swap in the content back from the swap file to the VM's memory and send the content of the VM's memory over a network to the destination host. Thus, using a per-VM swap file avoids swapping in the VM's memory on the source host, leading to less performance degradation during VM migration.

In another example, the per-VM swap files 420-1, 420-2, 420-3, . . . , 420-N are not stored on a shared storage between the source and destination hosts. In this case, while the swap file can no longer be directly opened by the destination host for VM migration, the source host can still send the swap file's contents over a network or some other transport to the destination host. While this may require some CPU cycles and storage and network bandwidth, it significantly reduces the pressure to the physical memory on the source host, providing better overall system performance.

Another advantage of using a per-VM swap file is that it also optimizes VM check-pointing. When a VM is check-pointed, VM execution stops and a "snapshot" of all the VM's state at that instant is saved. Later, the VM can be resumed by continuing the execution of the VM from the point it was check-pointed as if it had never stopped. When check-pointing a VM, all of the VM's states, including CPU and device state as well as its memory, are serialized and written out to a file. Thus, conventional virtualization systems using a common swap space would have to drain the VM's swapped memory from the per-host swap file, cause performance degradation. However, if a per-VM swap file is used, then when check-pointing a VM, the virtualization system only has to write out the parts of the VM's memory that are not swapped out to the swap files, as the swapped memory is already stored in the swap file. No expensive and disruptive swap-in operations would be needed for check-pointing the VM.

Figure 1:
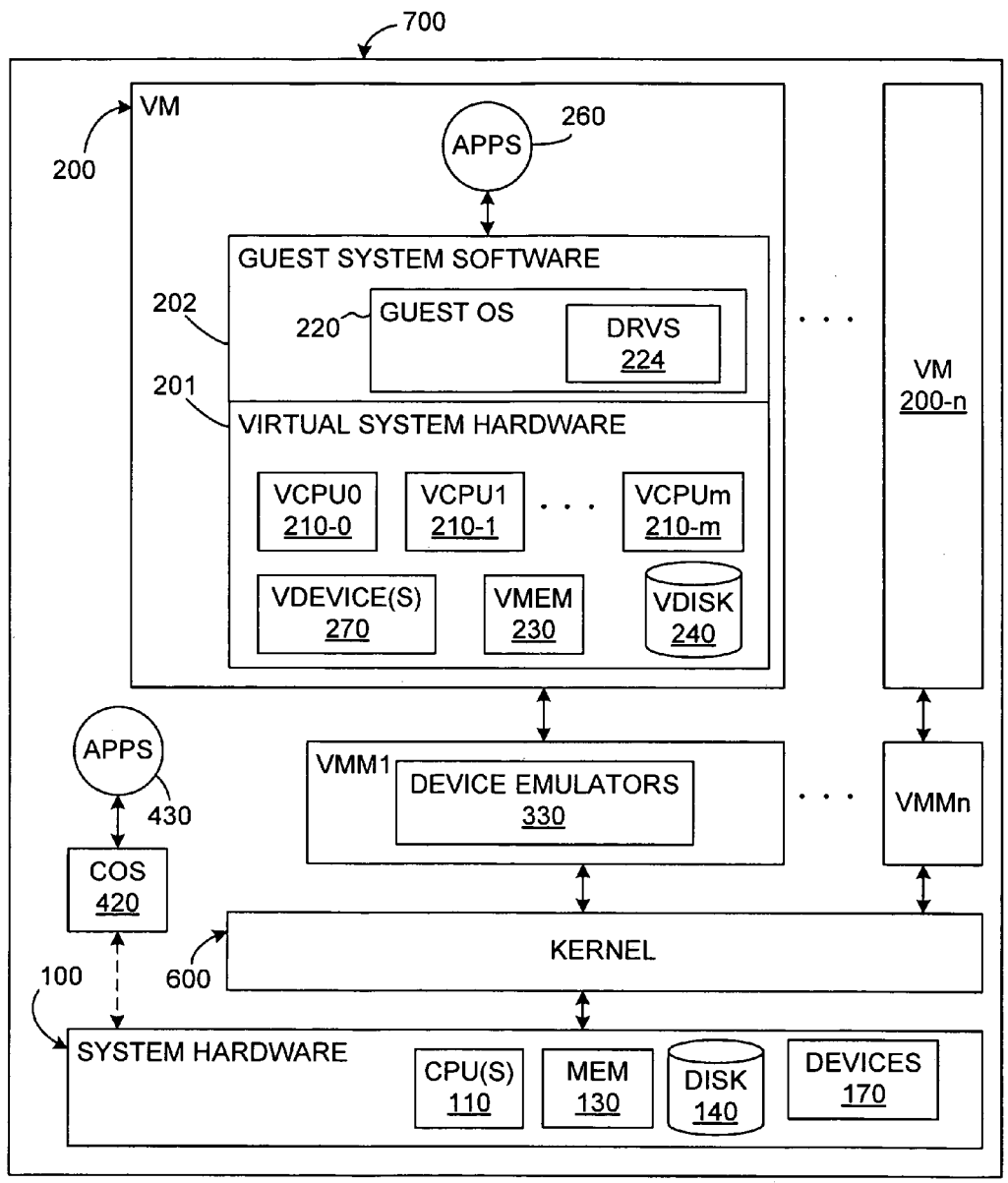
FIG. 1 illustrates a non-hosted virtualized system.
Figure 2:
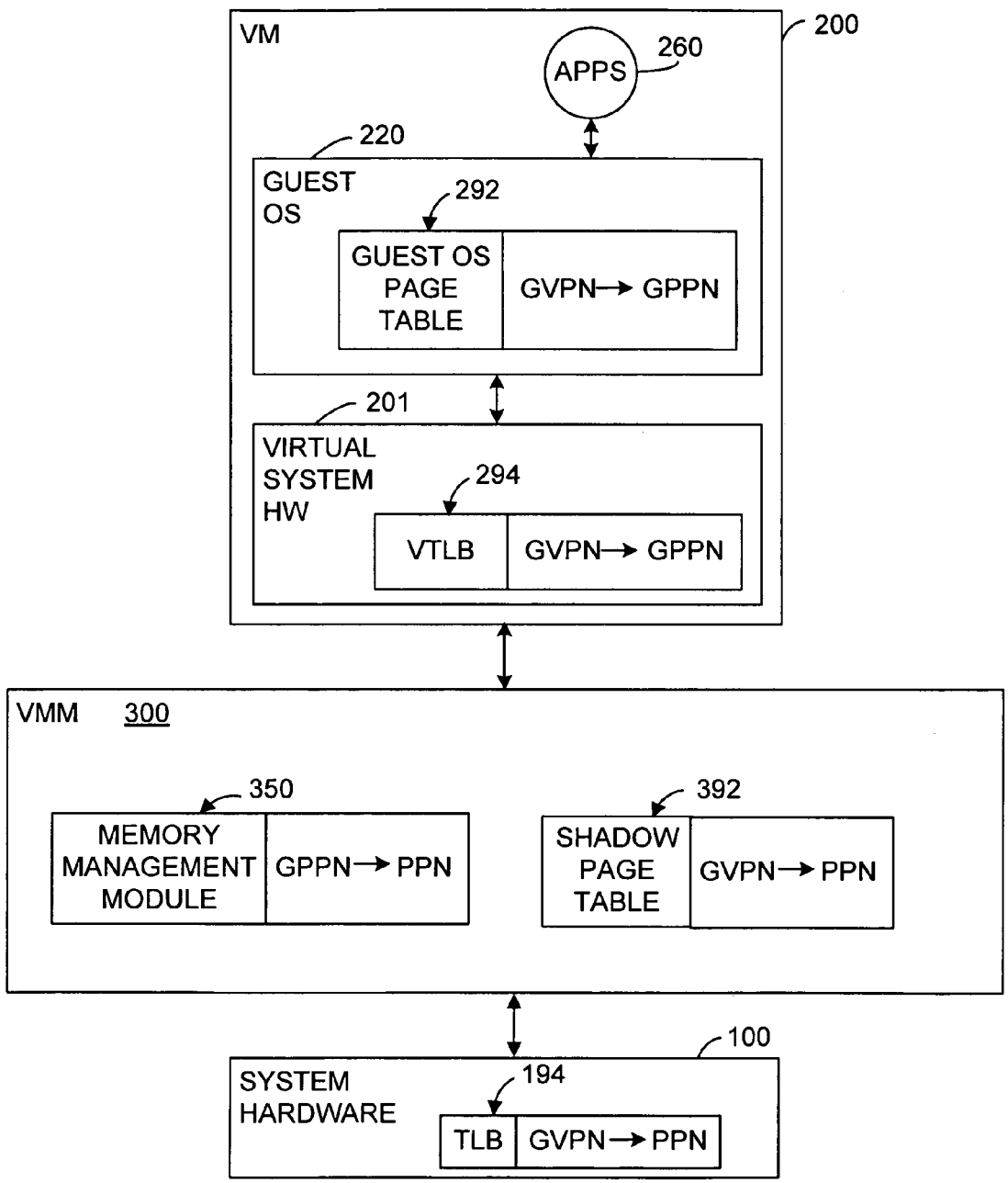
FIG. 2 illustrates virtual memory management and address mapping functions performed by the virtual machine monitor and other various components of the virtualized computer system.
Figure 3:
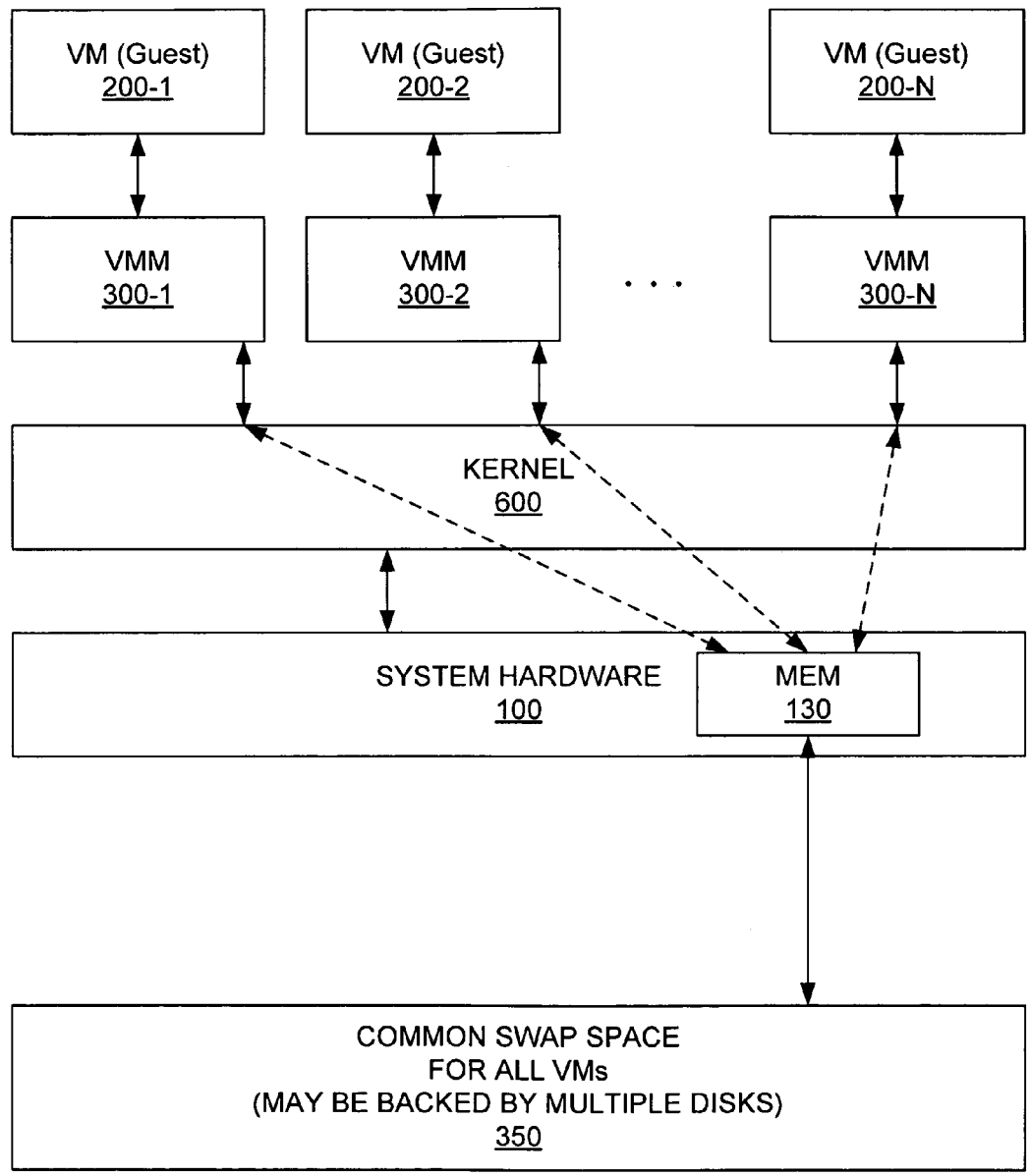
FIG. 3 illustrates a conventional swap space in a host computer system.

Still another advantage of using a per-VM swap file is that it improves VM isolation. In conventional virtualization systems using a common swap space as shown in FIG. 3, all VMs' swapped memory was lumped together in a single per-host swap space 350. Thus, it was not possible to give users access to the swap space 350 selectively on a per-VM basis, and a user either would have access to all VMs' swapped memory or no VM's swapped memory. In addition, it was not possible to individually configure each VM's swap space for a variety of quality of service parameters. In contrast, with the per-VM swap file of the present invention, all of the VM's swapped memory is contained within a regular per-VM swap file that can be controlled independently of other VMs' swap file, and is fully configurable. The swap file can be located on any storage located anywhere as long as it is accessible to the host computer system. For example, the swap file could be stored in the same directory with all the other VM-related files. For another example, since the swap file contains transient VM state, the swap file may be stored on less expensive storage that is not backed up, while the permanent VM state (such as its disk file) is stored on more expensive, backed up storage. For still another example, the swap file could be located on faster storage than other, less accessed, VM files, because the swap file is accessed frequently by the running VM or because the system administrator wants some VMs to have a better quality-of-service than other VMs have. The present invention can also be configured such that the locations of the swap files 420-1, 420-2, ..., 420-N for each VM are user-specified.

Still another advantage of using a per-VM swap file is that it enables flexible swap space persistence. In conventional virtualization systems using a common swap space as shown in FIG. 3, the common swap space 350 is pre-allocated for the system, but not for any VM in particular. Thus, a VM may fail to power-on because it may not be able to reserve space in the per-host swap space 350. In contrast, using a per-VM swap file, the swap file for each VM can be created at the same time as or prior to the powering on of the VM and also appropriately, such that the swap file exists for as long as the VM does. While the swap file is only needed when the VM is powered on, the swap file may optionally be configured to persist while the VM is powered off, thereby ensuring that the VM's swap file is always reserved on the swap space 400. Since the swap file is only for a particular VM, persisting the swap file does not waste a large amount of the swap space 400. Alternatively, the VM's swap file may also be deleted after the VM is powered off to reduce wasted disk space.

Still another advantage of using a per-VM swap file is that arbitrary and individual access controls, quality-of-service controls, and/or replication/redundancy requirements can be set for each swap file corresponding to a single VM. Since the swap file is a regular file, all regular access controls, quality-of-service controls, and/or replication/redundancy requirements of a regular file can likewise be applied to the swap file individually, which offers more flexibility.

Figure 6A:
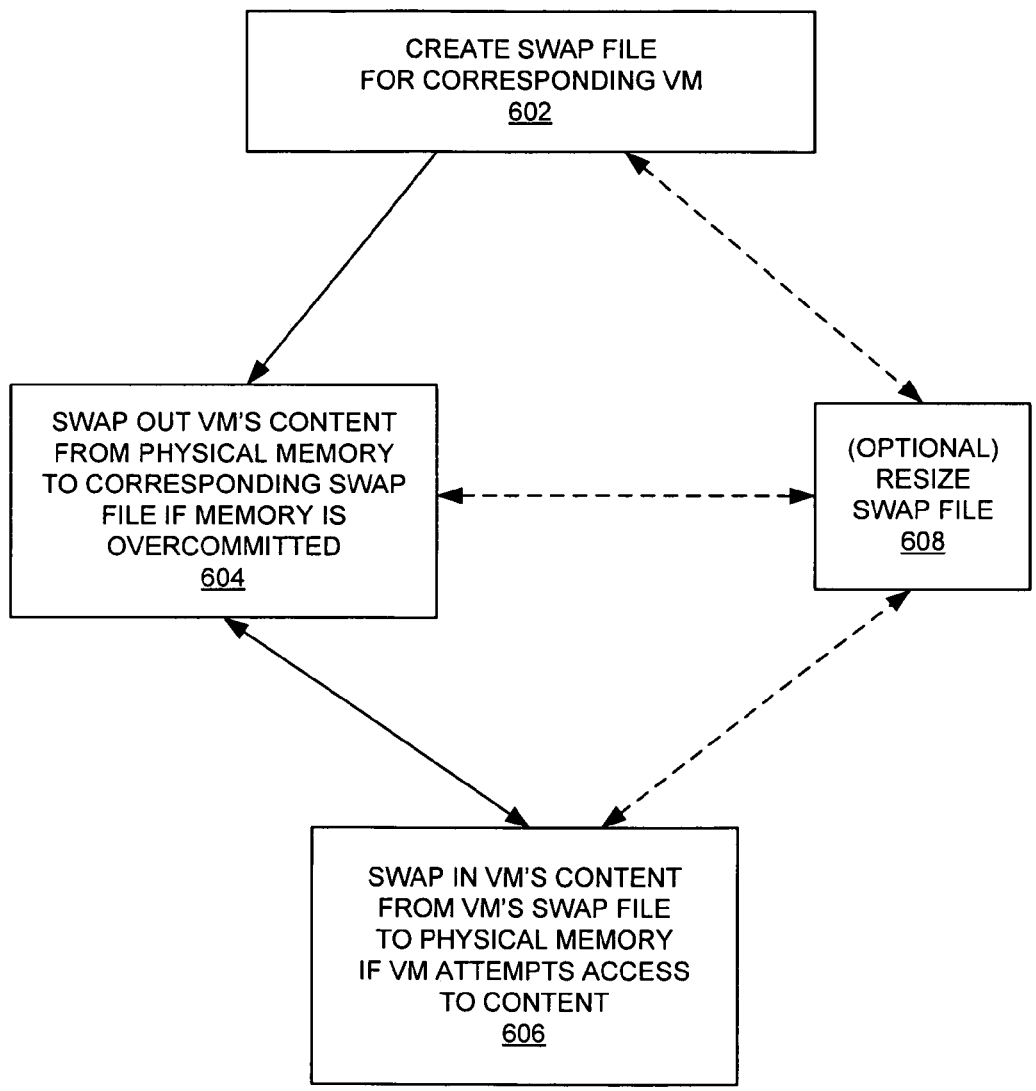
FIG. 6A illustrates a method of creating and using a swap file for a VM in a host computer system, according to one embodiment of the present invention.

FIG. 6A illustrates a method of creating and using a swap file for a VM in a host computer system, according to one embodiment of the present invention. The method of FIG. 6A may be performed by the kernel 600 or other similar virtualization software in the host computer system. The method starts by creating 602 a swap file (e.g., swap file 420-1 in FIG. 4) dedicated for a single VM (e.g., VM 200-1 in FIG. 4). Each swap file stores only memory content swapped out from the part of the physical memory 130 that is associated with a single corresponding VM, as explained above. When the part of the physical memory 130 that is associated with a corresponding VM is over-committed, the content is swapped out 604 and stored in the swap file corresponding to the VM. Such content can also be swapped back in 606 from the VM's swap file to the part of the physical memory 130 that is associated with the corresponding VM, if the VM attempts to access the content. In addition, the size of the swap file may be readjusted 608 at any step of the process, if necessary. Note that the swap-out steps 604 and swap-in steps 606 may be interleaved or concurrent. Each step 602, 604, 606, 608 will be explained in more detail with reference to FIGS. 6B-6E below.

Figure 6B:
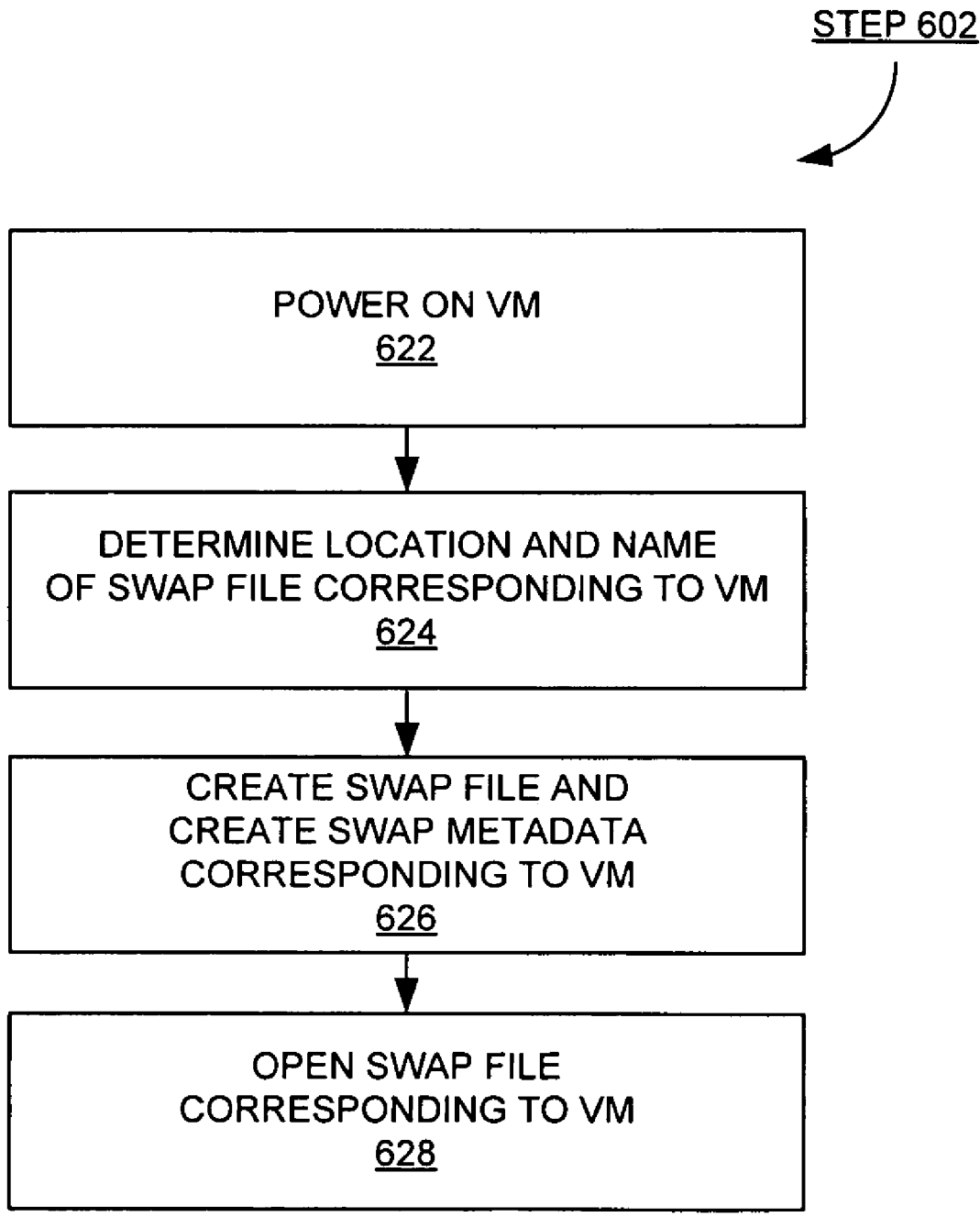
FIG. 6B illustrates a method of creating a swap file for a VM in a host computer system in more detail, according to one embodiment of the present invention.

FIG. 6B illustrates the method 602 of creating a swap file for a VM in a host computer system in more detail, according to one embodiment of the present invention. As a particular VM is powered on 622 on the host computer system, the location and name of one or more swap files corresponding to that particular VM is determined 624. In some embodiments, such location and name of the swap files can be set by a user of the host computer system. Then, the swap file and the swap metadata for the VM are created 626.

As explained previously, the swap file is created 626 as a regular file with one of the file formats explained above or another file format. Note that each swap file is configured to store content swapped out from only the part of the physical memory 130 that is associated with the corresponding VM, as explained above. In one embodiment, the size of the swap file is created to be equal to the partition of the memory 130 on which the corresponding VM runs minus the reserved part of the memory partition. In another embodiment, the size of the swap file is created as zero initially, and grows and is resized 608 as necessary. In still another embodiment, the swap file is identity mapped to the memory partition on which the corresponding VM runs, such that its size is identical to the size of that memory partition. The swap metadata indicates which swap slots of the swap file are used or free. Then, the created swap file is opened 628, and the VM continues to power on.

Figure 6C:
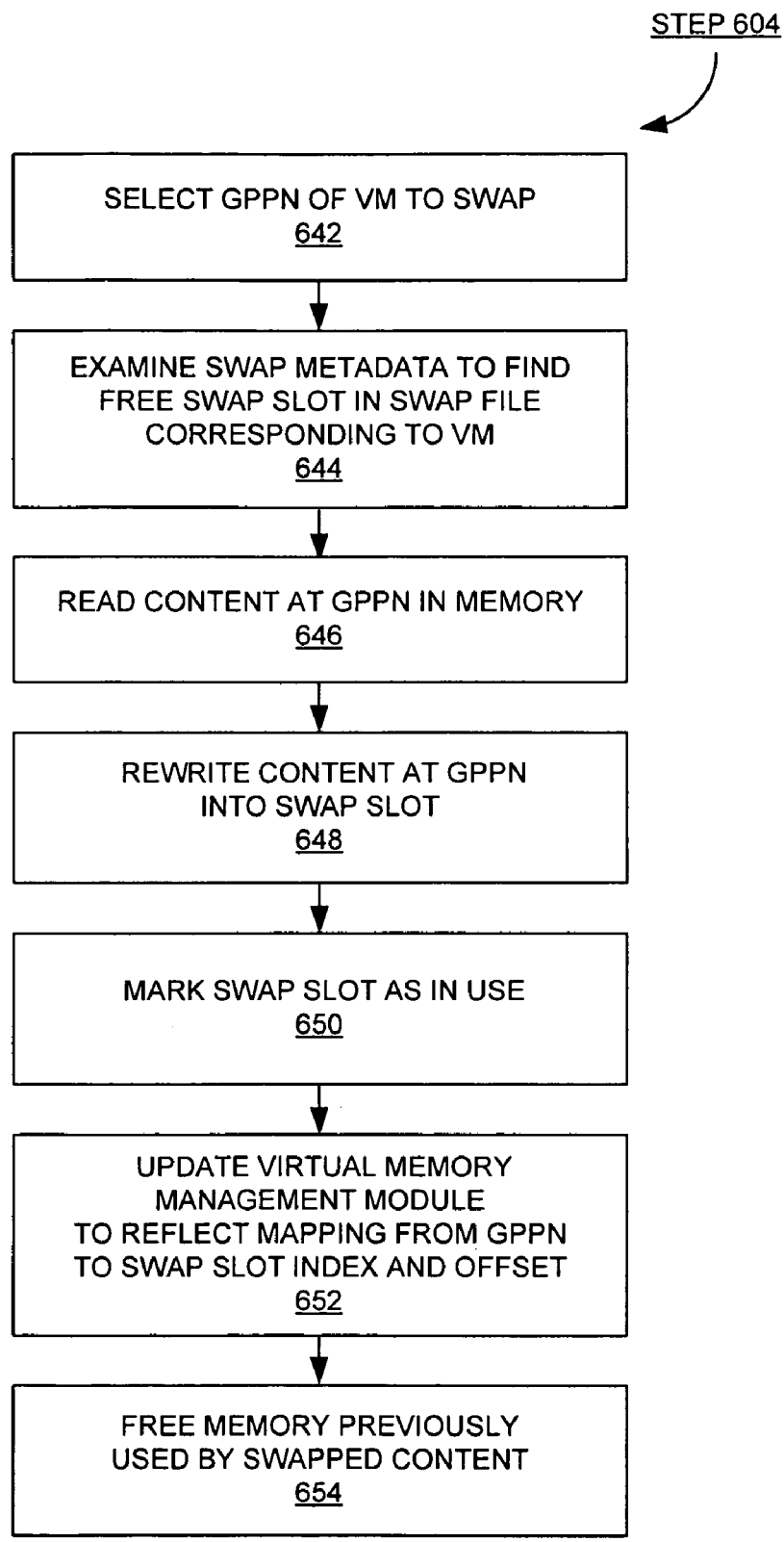
FIG. 6C illustrates a method of swapping out content from the physical memory to store the content in a swap file in a host computer system in more detail, according to one embodiment of the present invention.

FIG. 6C illustrates the method of swapping out 604 content from the physical memory to store the content in a swap file in a host computer system in more detail, according to one embodiment of the present invention. When the physical memory is over-committed, there arises a need to swap out content from the physical memory to the swap file. In this regard, the GPPN (Guest Physical Page Number) of the content in the part of the physical memory corresponding to the VM to be swapped is selected 642. Then, the swap metadata is examined to find 644 a free swap slot in the swap file corresponding to the VM. Note that step 644 is not necessary if the swap file is identity-mapped to the memory. The content of the memory 130 at the GPPN is read 646 and the content is written 648 to the free swap slot found in step 644. Then, the swap slot is marked 650 as "in use" in the swap metadata, and the virtual memory management module 350 is updated 652 to reflect the mapping from the GPPN to the index to the swap slot and the offset. Finally, the part of the memory previously used by the swapped out content is freed 654 for use by the corresponding VM or other VMs.

Figure 6D:
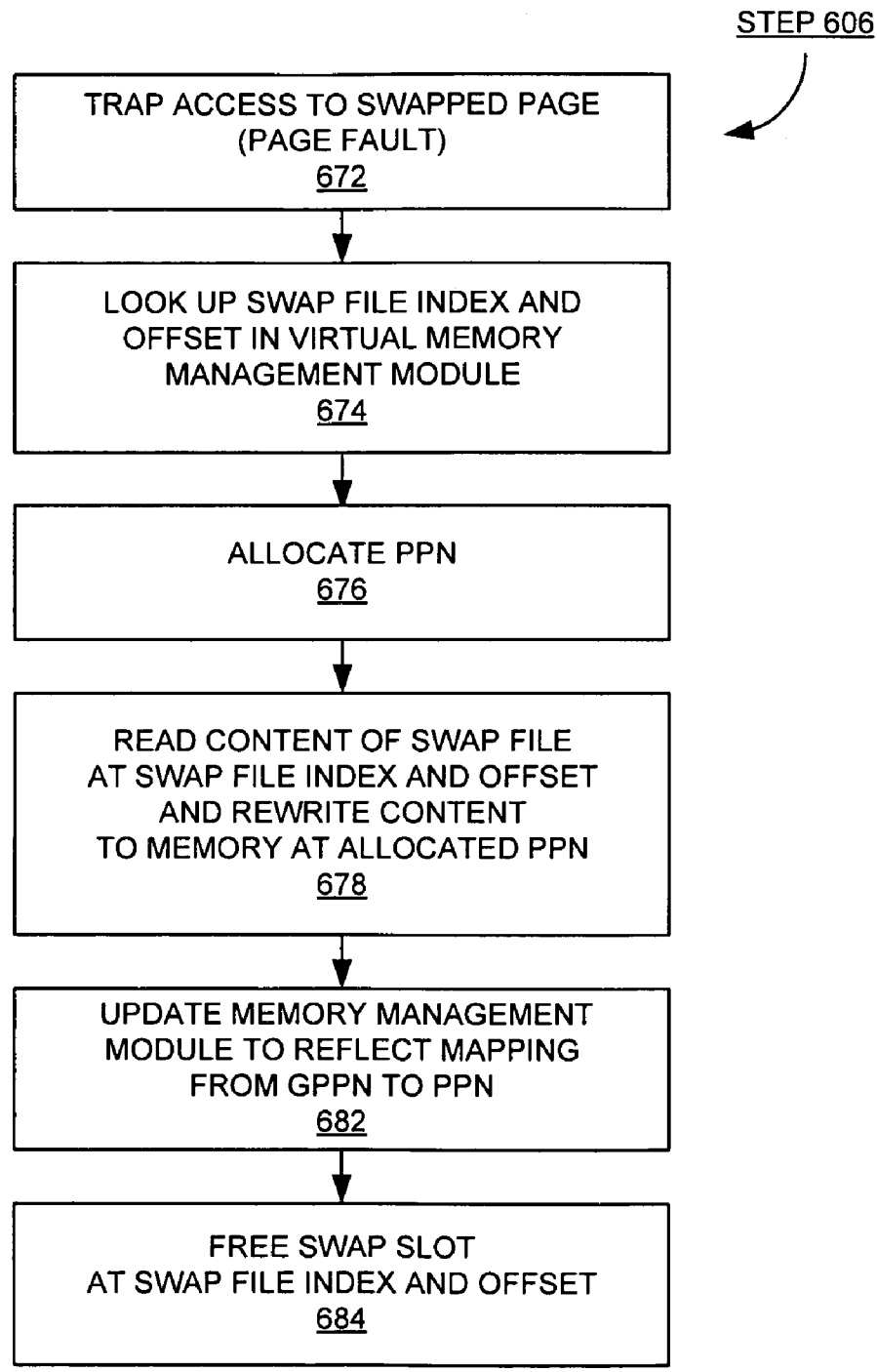
FIG. 6D illustrates a method of swapping in content stored in the swap file back to the physical memory in a host computer system in more detail, according to one embodiment of the present invention.

FIG. 6D illustrates a method of swapping in content stored in the swap file to the physical memory in a host computer system in more detail, according to one embodiment of the present invention. When the VM corresponding to the swap file attempts to access data swapped out and stored in the swap file, there arises a need to swap in the content from the swap file back to host physical memory 130. This need occurs when an access to a swapped memory page is trapped 672, which would result in a page fault.

When such page fault occurs, the swap file index and the offset to the swapped out content in the swap file is looked up 674 in the virtual memory management module 350. A PPN is allocated 676 to accommodate the content to be swapped back into the memory 130, and the content of the swap file is read 678 at the swap file index and offset. The read content is written 680 to the memory 130 at the allocated PPN, and the virtual memory management module 350 is updated 682 to reflect the mapping from the GPPN to the PPN. Finally, the swap slot at the swap file index and offset is freed 684 in the swap metadata for further use by the memory.

Figure 6E:
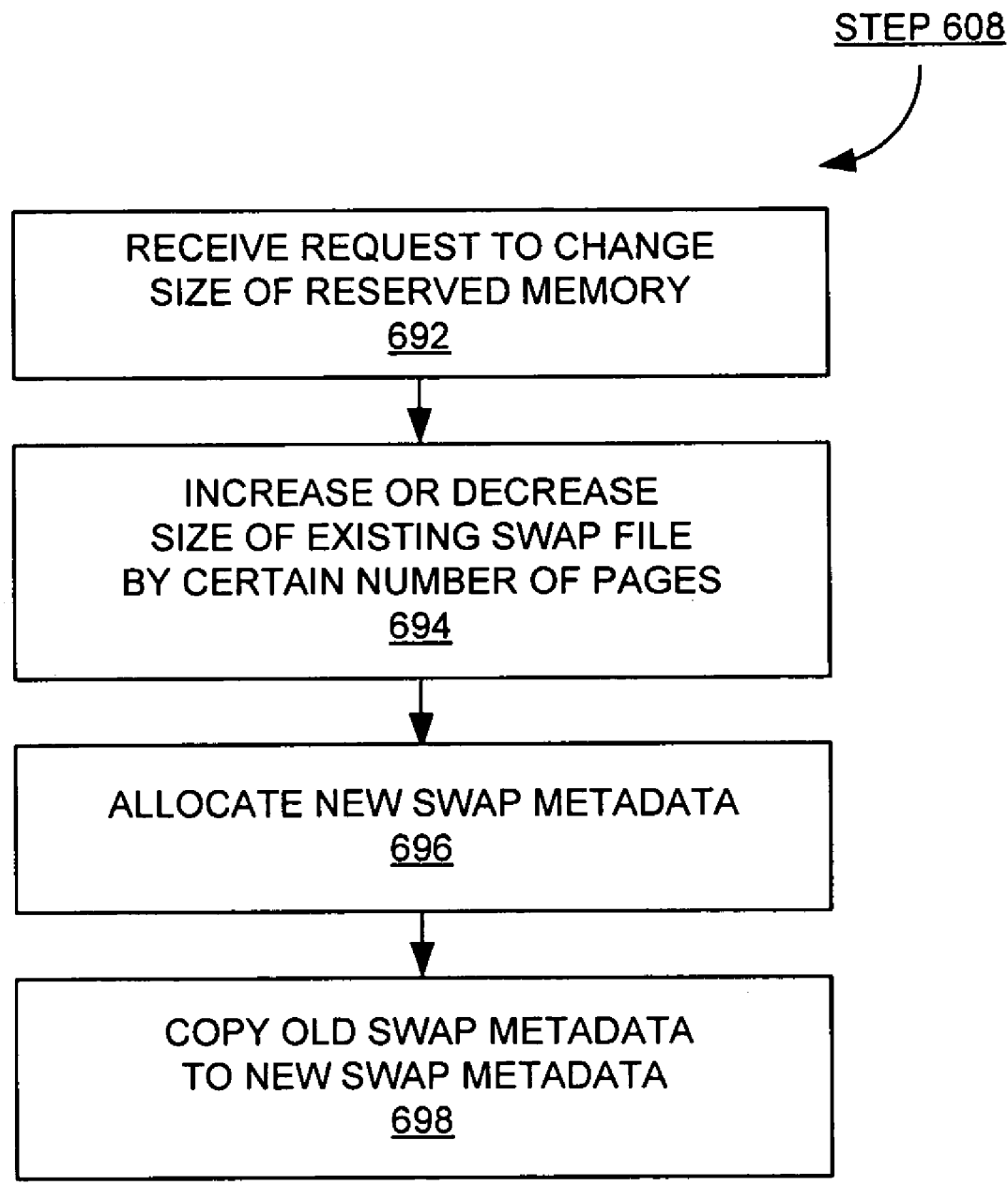
FIG. 6E illustrates a method of resizing the swap file for the VM in a host computer system in more detail, according to one embodiment of the present invention.

FIG. 6E illustrates the method 608 of resizing the swap file for the VM in a host computer system in more detail, according to one embodiment of the present invention. According to the present invention, the swap file may be dynamically resized as necessary. For instance, if the minimum reserved part of the host memory available to the VM is reduced, then the VM's swap file would need to grow to account for the difference. On the other hand, if the minimum reserved part of the host memory available to the VM is increased, then less swap file space is needed and thus the VM's swap file may shrink.

In short, a re-sizing of the swap file occurs when a request to change the size of the reserved part of the memory is received 692. In response, the size of the existing swap file is increased 694 when the size of the reserved part of the memory is decreased or the size of the existing swap file may be decreased 694 when the size of the reserved part of the memory is increased, by a certain number of pages. Then, a new swap metadata corresponding to the re-sized swap file is allocated 696, and the contents of the old swap metadata are copied 698 to the new swap metadata to complete the process of resizing the swap file. Note that steps 696 and 698 are sometimes unnecessary. For example, the swap file can be simply truncated when its size is being reduced, and can simply be extended without copying 698 when its size is being increased.

Figure 7:
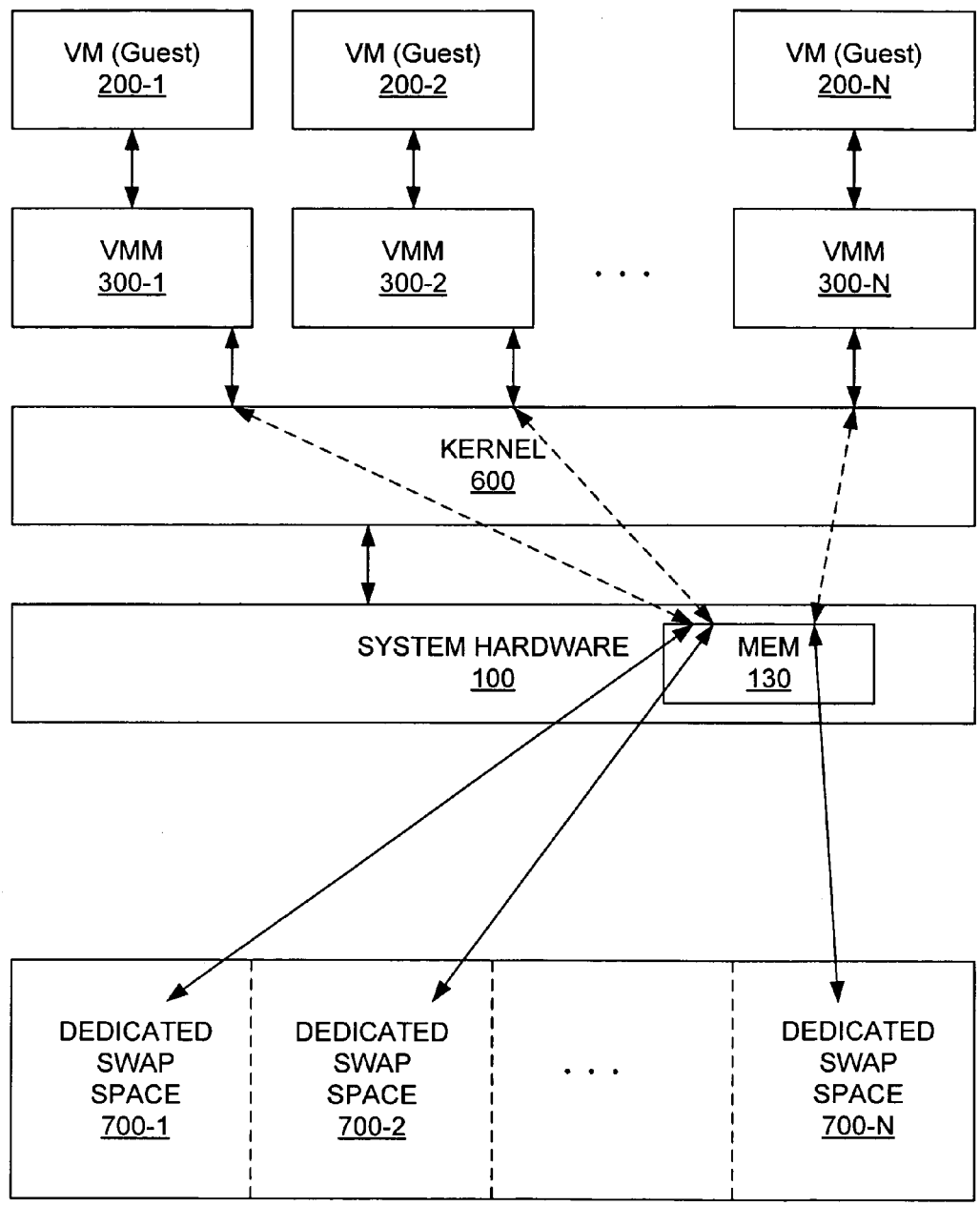
FIG. 7 illustrates a swap space in a host computer system, according to another embodiment of the present invention.

FIG. 7 illustrates a swap space in a host computer system, according to another embodiment of the present invention. The embodiment illustrated in FIG. 7 is identical to the embodiment illustrated in FIG. 4, except that dedicated swap spaces 700-1, 700-2, ..., 700-N are used instead of the swap files 420-1, 420-2, ..., 420-N. The dedicated swap spaces 700-1, 700-2, ..., 700-N are not in the form of regular files as in the embodiment of FIG. 4. However, each of the dedicated swap spaces 700-1, 700-2, ..., 700-N is used to swap out content from the parts of the memory only corresponding to a single VM. For example, the dedicated swap space 700-1 is used to swap out memory content only for VM 200-1, the dedicated swap space 700-2 is used to swap out memory content only for VM 200-2, and so on. The locations of each of the dedicated swap spaces 700-1, 700-2, ..., 700-N are also known to the kernel 600. Therefore, this embodiment is different from the conventional swap space illustrated in FIG. 3, where a common swap space 350 is used to swap out content from the memory for a plurality of VMs and where there is no dedicated part or dedicated section of the swap space used for a particular VM.

Figure 8:
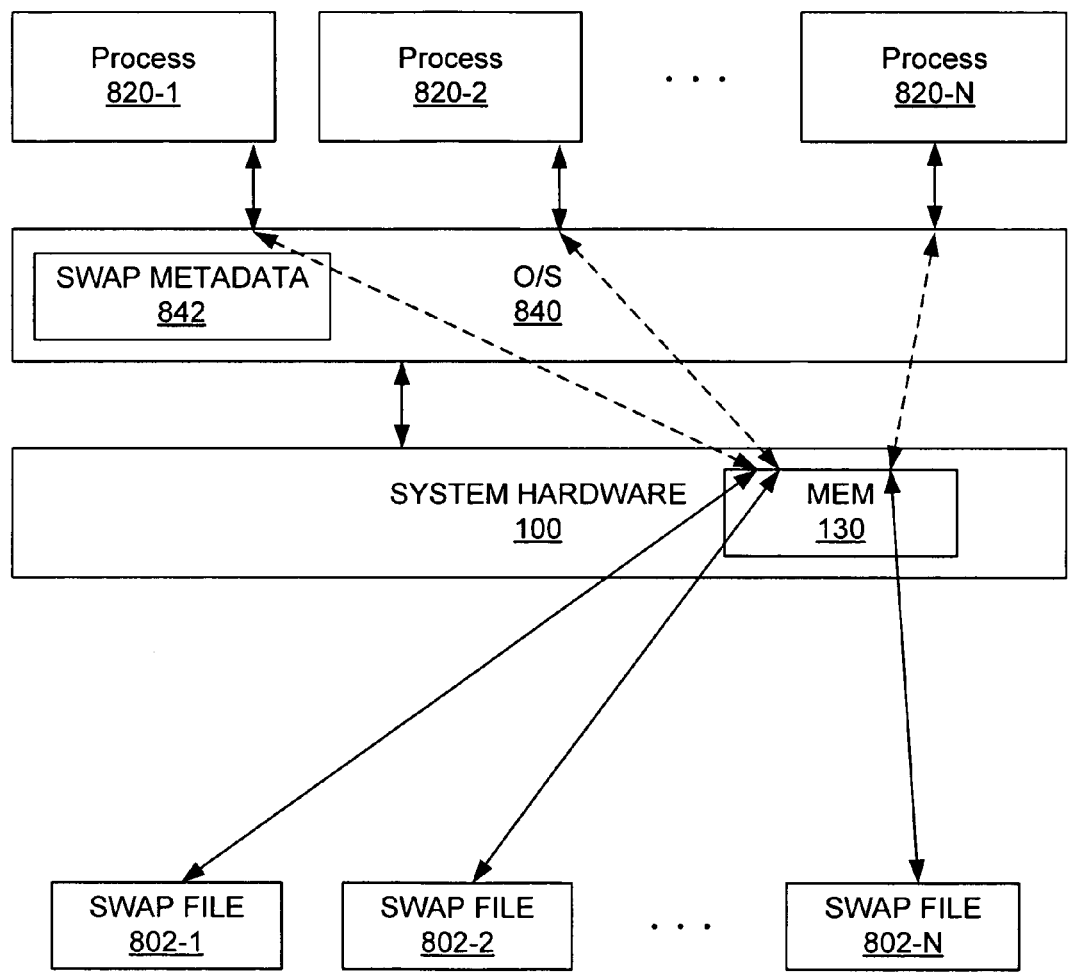
FIG. 8 illustrates a swap space used with a standard operating system, according to still another embodiment of the present invention.

FIG. 8 illustrates a swap space used with a standard operating system, according to still another embodiment of the present invention. The concept of per-VM swap files can be applied to standard operating systems in the form of a "per-process" swap file. Conventional operating systems typically use a single, per-host common swap space shared amongst all applications or processes running on that operating system. In contrast, according to the present invention, a per-process swap file can be used to give the system administrator the same types of flexibility and other advantages as per-VM swap files do. Per-process swap files according to the present invention may be used if the resource management controls also occur on a per-process level. The embodiment illustrated in FIG. 8 is an example of per-process swap files 802-1, 802-2, ..., 802-N used with an operating system (O/S) 840. The embodiment shown in FIG. 8 is very similar to the embodiment illustrated in FIG. 4, except that the swap files 802-1, 802-2, ..., 802-N are used to swap out content from parts of the memory 130 that are used by the processes 820-1, 820-2, ..., 802-N running on the O/S 840. The swap metadata 842 would contain the same information regarding the swap files 802-1, 802-2, ..., 802-N as the swap metadata 602-1, 602-2, ..., 602-N in FIG. 5. The per-process swap files of FIG. 8 provide advantages similar to those provided by the per-VM swap files of FIG. 4.

Upon reading this disclosure, those of skill in the art will appreciate still additional alternative embodiments for memory swap space management through the disclosed principles of the present invention. For example, while FIGS. 4 and 5 illustrate an example where a single swap file is allocated to each VM, the present invention allows for more than one swap file to back up a single VM's swap space. In most cases, a single swap file may be sufficient for a VM, but there may be situations where more than one swap file may be desirable for a VM. For instance, if the VM's single swap file is near its capacity, then a new swap file could be created for the VM on a different piece of storage that has more free space and all new swap-out requests could then be directed to the new swap file. The new swap file could be created and used in real time while the VM is powered on and running. For another example, in a para-virtualized environment, where one application's data should be maintained confidential and should only be swapped to an encrypted swap file, while another application's data can be swapped to a normal, unencrypted swap file, such VM may have two swap files, one encrypted and the other one unencrypted. In a more complex example, during VM migration where the source host and the destination host have no shared storage, the destination host may set up a container VM to hold the content of the incoming VM's memory. While not running, this container VM is utilizing memory and may have to swap out content if there is host memory pressure. Since the VM's current swap file for the source host is not accessible by the destination host, a temporary swap file may be created. Eventually, once the VM migration is complete, the original swap file for the VM will be copied from the source host, and the VM will begin execution on the destination host. At that point, the VM has two swap files: the original swap file that was copied from the source host and the temporary swap file used during VM migration. The temporary swap file may be set read-only at that point, with all new swap-out requests being directed to the original swap file.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a host computer running a plurality of virtual machines on a physical memory of the host computer, a computer-implemented method of swapping data corresponding to one of the virtual machines from the physical memory, the method comprising:
    creating at least one swap file to be used as a swap space, the swap file being dedicated to only said one of the virtual machines;
    swapping out data corresponding to said one of the virtual machines from the physical memory to the swap file;
    said one of the virtual machines is migrated from the host computer to another destination host computer;
    the swap file is located on a shared storage device accessible by both the host computer and said destination host computer; and
    the swap file is opened by the destination host computer for migrating the virtual machine to said destination host computer.

2. The method of claim 1, wherein the shared storage device is a storage area network (SAN) or network-attached storage accessible by both the host computer and said destination host computer.

3. The method of claim 1, wherein:
    said one of the virtual machines is migrated from the host computer to another destination host computer;
    the swap file is accessible by the host computer but is not accessible by said destination host computer; and
    contents of the swap file are sent to the destination host computer over a transport for migrating the virtual machine to said destination host computer.

4. The method of claim 1, wherein the swap file is a flat file logically split up in portions.

5. The method of claim 1, wherein the swap file includes a data section storing the data swapped out from the physical memory and a metadata section storing the mappings from portions of the physical memory to locations of the corresponding portions of the swap file.

6. The method of claim 1, wherein the swap file is identity-mapped to a portion of the physical memory corresponding to said one of the virtual machines.

7. The method of claim 1, wherein a plurality of swap files are created for the plurality of virtual machines, the swap files including a first swap file dedicated to swapping first data corresponding to only a first virtual machine and a second swap file dedicated to swapping second data corresponding to only a second virtual machine, and the first swap file including first parameters different from second parameters included in the second swap file.

8. The method of claim 7, wherein the first parameters include access control to the first swap file.

9. The method of claim 7, wherein the first swap file is stored at a location different from where the second swap file is stored.

10. The method of claim 1, wherein the step of creating the swap file comprises:
    determining a location and a name of the swap file dedicated to only said one of the virtual machines;
    creating the swap file corresponding to said one of the virtual machines; and
    opening the swap file.

11. The method of claim 10, wherein the step of swapping out data comprises:
    reading the data from the memory at a guest physical page number (GPPN) for a virtual memory;
    storing the read data in a free swap slot;
    marking the swap slot as in use;
    updating the virtual memory to reflect mapping from the GPPN to a swap slot index and an offset corresponding to the swap slot; and
    freeing a part of the memory previously used by the data.

12. The method of claim 11, further comprising swapping in the data corresponding to said one of the virtual machines from the swap file to the physical memory by:
    allocating a physical page number (PPN) for the virtual memory;
    reading the data from the swap file at the swap file index and the offset;
    storing the data in the memory at the PPN;
    updating the virtual memory to reflect mapping from the GPPN to the PPN; and
    freeing the swap slot at the swap file index and the offset.

13. The method of claim 1, wherein a size of the swap file is increased or decreased responsive to a reserved portion of the physical memory being decreased or increased, respectively.

14. For a host computer running a plurality of virtual machines on a physical memory of the host computer, a computer program product stored on a computer readable medium and configured to perform a computer-implemented method of swapping data corresponding to one of the virtual machines from the physical memory, the method comprising:
    creating at least one swap file to be used as a swap space, the swap file being dedicated to only said one of the virtual machines;
    swapping out data corresponding to said one of the virtual machines from the physical memory to the swap file;
    said one of the virtual machines is migrated from the host computer to another destination host computer;
    the swap file is located on a shared storage device accessible by both the host computer and said destination host computer; and
    the swap file is opened by the destination host computer for migrating the virtual machine to said destination host computer.

15. The computer program product of claim 14, wherein the shared storage device is a storage area network (SAN) or a network-attached storage accessible by both the host computer and said destination host computer.

16. The computer program product of claim 14, wherein:
    said one of the virtual machines is migrated from the host computer to another destination host computer;
    the swap file is accessible by the host computer but is not accessible by said another destination host computer; and
    contents of the swap file are sent to the destination host computer over a transport for migrating the virtual machine to said destination host computer.

17. The computer program product of claim 14, wherein the swap file is a flat file logically split up in portions.

18. The computer program product of claim 14, wherein the swap file includes a data section storing the data swapped out from the physical memory and a metadata section storing the mappings from portions of the physical memory to locations of the corresponding portions of the swap file.

19. The computer program product of claim 14, wherein the swap file is identity-mapped to a portion of the physical memory corresponding to said one of the virtual machines.

20. The computer program product of claim 14, wherein a plurality of swap files are created for the plurality of virtual machines, the swap files including a first swap file dedicated to swapping first data corresponding to only a first virtual machine and a second swap file dedicated to swapping second data corresponding to only a second virtual machine, and the first swap file including first parameters different from second parameters included in the second swap file.

21. The computer program product of claim 20, wherein the first parameters include access control to the first swap file.

22. The computer program product of claim 20, wherein the first swap file is stored at a location different from where the second swap file is stored.

23. The computer program product of claim 14, wherein the step of creating the swap file comprises:
   determining a location and a name of the swap file dedicated to only said one of the virtual machines;
   creating the swap file corresponding to said one of the virtual machines; and
   opening the swap file.

24. The computer program product of claim 23, wherein the step of swapping out data comprises:
   reading the data from the memory at a guest physical page number (GPPN) for a virtual memory;
   storing the read data in a free swap slot;
   marking the swap slot as in use;
   updating the virtual memory to reflect mapping from the GPPN to a swap slot index and an offset corresponding to the swap slot; and
   freeing a part of the memory previously used by the data.

25. The computer program product of claim 24, further comprising swapping in the data corresponding to said one of the virtual machines from the swap file to the physical memory by:
   allocating a physical page number (PPN) for the virtual memory;
   reading the data from the swap file at the swap file index and the offset;
   storing the data in the memory at the PPN;
   updating the virtual memory to reflect mapping from the GPPN to the PPN; and
   freeing the swap slot at the swap file index and the offset.

26. The computer program product of claim 14, wherein a size of the swap file is increased or decreased responsive to a reserved portion of the physical memory being decreased or increased, respectively.

27. A host computer running a plurality of virtual machines on a physical memory of the host computer, the host computer including a storage device storing computer instructions configured to perform a computer-implemented method of swapping data corresponding to one of the virtual machines from the physical memory, and one or more central processing units for executing the computer instructions, the method comprising:
   creating at least one swap file to be used as a swap space, the swap file being dedicated to only said one of the virtual machines;
   swapping out data corresponding to said one of the virtual machines from the physical memory to the swap file;
   said one of the virtual machines is migrated from the host computer to another destination host computer;
   the swap file is located on a shared storage device accessible by both the host computer and said destination host computer; and
   the swap file is opened by the destination host computer for migrating the virtual machine to said destination host computer.

28. The host computer of claim 27, wherein the shared storage device is a storage area network (SAN) or a network-attached storage accessible by both the host computer and said destination host computer.

29. The host computer of claim 27, wherein:
   said one of the virtual machines is migrated from the host computer to another destination host computer;
   the swap file is accessible by the host computer but is not accessible by said destination host computer; and
   contents of the swap file are sent to the destination host computer over a transport for migrating the virtual machine to said destination host computer.

30. The host computer of claim 27, wherein the swap file is a flat file logically split up in portions.

31. The host computer of claim 27, wherein the swap file includes a data section storing the data swapped out from the physical memory and a metadata section storing the mappings from portions of the physical memory to locations of the corresponding portions of the swap file.

32. The host computer of claim 27, wherein the swap file is identity-mapped to a portion of the physical memory corresponding to said one of the virtual machines.

33. The host computer of claim 27, wherein a plurality of swap files are created for the plurality of virtual machines, the swap files including a first swap file dedicated to swapping first data corresponding to only a first virtual machine and a second swap file dedicated to swapping second data corresponding to only a second virtual machine, and the first swap file including first parameters different from second parameters included in the second swap file.

34. The host computer of claim 33, wherein the first parameters include access control to the first swap file.

35. The host computer of claim 33, wherein the first swap file is stored at a location different from where the second swap file is stored.

36. The host computer of claim 27, wherein the step of creating the swap file comprises:
   determining a location and a name of the swap file dedicated to only said one of the virtual machines;
   creating the swap file corresponding to said one of the virtual machines; and
   opening the swap file.

37. The host computer of claim 36, wherein the step of swapping out data comprises:
   reading the data from the memory at a guest physical page number (GPPN) for a virtual memory;
   storing the read data in a free swap slot;
   marking the swap slot as in use;
   updating the virtual memory to reflect mapping from the GPPN to a swap slot index and an offset corresponding to the swap slot; and
   freeing a part of the memory previously used by the data.

38. The host computer of claim 37, further comprising swapping in the data corresponding to said one of the virtual machines from the swap file to the physical memory by:
   allocating a physical page number (PPN) for the virtual memory;
   reading the data from the swap file at the swap file index and the offset;
   storing the data in the memory at the PPN;
   updating the virtual memory to reflect mapping from the GPPN to the PPN; and
   freeing the swap slot at the swap file index and the offset.

39. The host computer of claim 27, wherein a size of the swap file is increased or decreased responsive to a reserved portion of the physical memory being decreased or increased, respectively.

* * * * *

UNITED STATES PATENT AND TRADEMARK OFFICE
CERTIFICATE OF CORRECTION

PATENT NO. : 7,624,240 B1  Page 1 of 1
APPLICATION NO. : 11/582734
DATED : November 24, 2009
INVENTOR(S) : Colbert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this

Twenty-sixth Day of October, 2010

David J. Kappos
*Director of the United States Patent and Trademark Office*